(No Model.) 2 Sheets—Sheet 1.

O. L. PARMENTER.
EGG AND FRUIT CARRIER.

No. 276,273. Patented Apr. 24, 1883.

Attest.
Wm Strehli
Ed R Hill

Inventor.
Orville L. Parmenter
per Wm. Hubbell Fisher,
Atty.

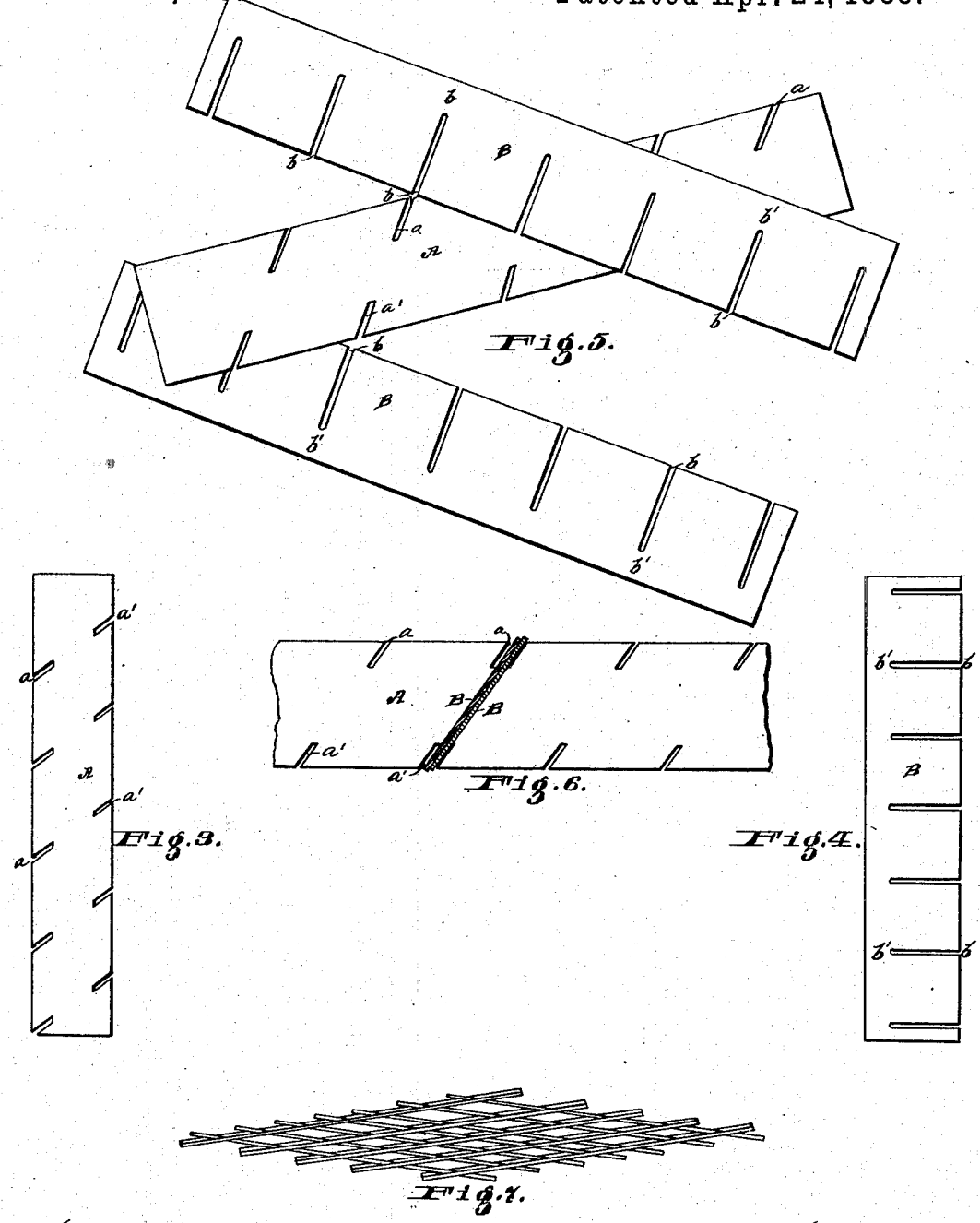

UNITED STATES PATENT OFFICE.

ORVILLE L. PARMENTER, OF CINCINNATI, ASSIGNOR TO THE LIMA PAPER MILL, OF LIMA, OHIO.

EGG AND FRUIT CARRIER.

SPECIFICATION forming part of Letters Patent No. 276,273, dated April 24, 1883.

Application filed March 14, 1883. (No model.)

*To all whom it may concern:*

Be it known that I, ORVILLE L. PARMENTER, of the city of Cincinnati, in Hamilton county, and State of Ohio, have invented certain new and useful Improvements in Egg and Fruit Carriers, of which the following is a specification.

The object of my invention is to provide a filling for cases for transporting eggs, fruit, and the like. This filling consists of one or more trays, each provided with a number of cells, the cells of each tray having parallel walls, at least two of said walls being placed at an angle to the plane of the tray, causing the cells to be inclined in such a manner that an egg or its equivalent placed in a cell of one tray will rest upon the side of the upper end of an inclined wall of a cell of the tray immediately below, thus dispensing with a bottom proper for those trays which in turn rest upon a tray below, and with all diaphragms and division-boards such as are usually placed between the various trays in the case.

One feature of my invention therefore consists generally of an arrangement in an inclined position of the cells; and another feature of my invention consists in the preferred manner of constructing the walls of the cells and of connecting them together.

Figure 1:
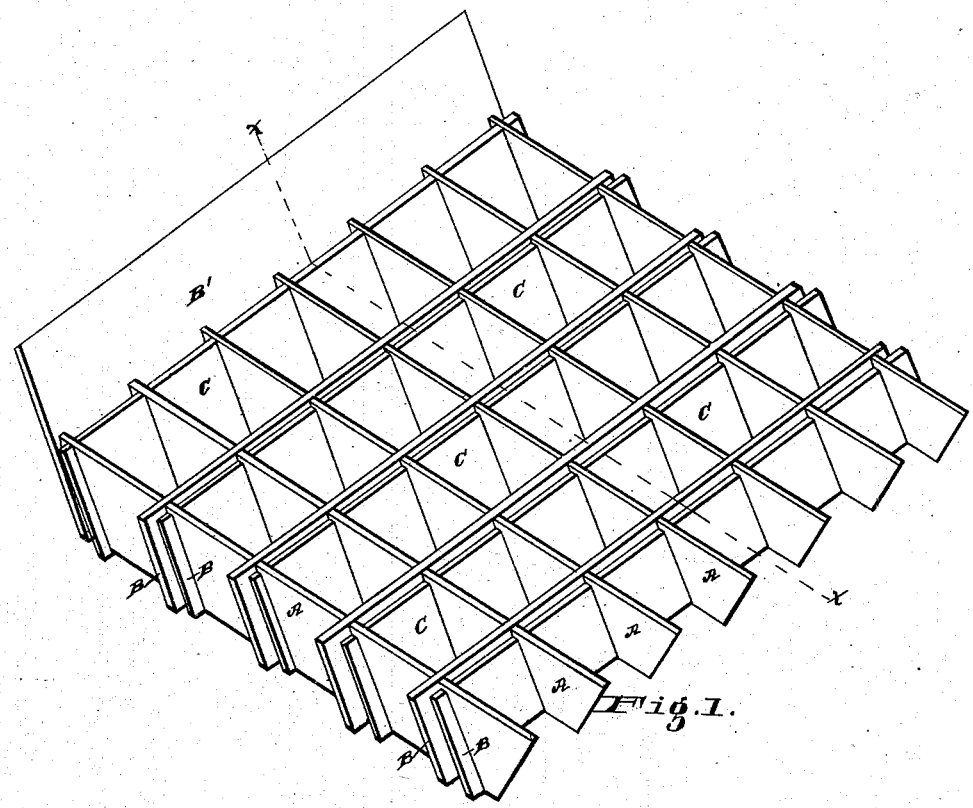
Figure 2:
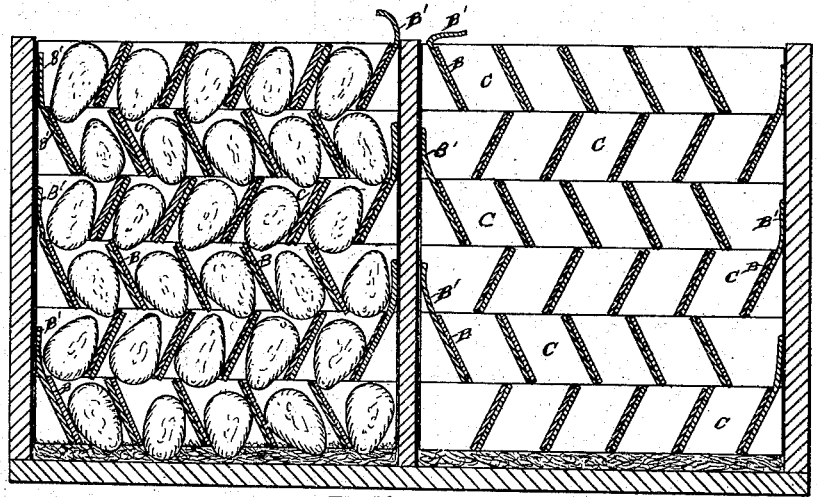

Referring to the drawings forming part of this specification, Figure 1 is a perspective view of one of the trays removed from the case, showing said tray open in a position to receive the eggs. Fig. 2 represents a transverse vertical section, taken at the line $x\ x$ of Fig. 1, and representing several trays in position in the case, and showing the manner in which the eggs in one tray rest upon and are supported by the partitions between the cells of the tray immediately below. Figs. 3, 4, 5, and 6 represent the preferred mode of forming the tray, Figs. 3 and 4 representing the strips which, when put together, form the tray. Fig. 5 shows the strips in the position they assume when in readiness to be put together. Fig. 6 shows the strips in the position they occupy when joined together, and Fig. 7 is an end view of the tray when folded or "knocked down" when empty and for transportation. These strips are to be of any suitable material. They are preferably made of light straw-board, and the preferred mode of making the filling is as follows:

The strips A, which extend parallel to the length of the case, are provided with the diagonal slots or notches $a\ a'$, cut in the strips at an angle to the edge thereof, the slots $a$ in one edge being preferably at the same angle and in a line with the slots $a'$ in the opposite edge of said strip. These strips A form the vertical sides of the cells. The strips B are each provided with the deep slots $b$, all formed in the same edge of the strip, the portion $b'$ of said strip between the bottom of the slot $b$ and the opposite edge of the strip being preferably equal in width to the depth of the slots $a\ a'$ in the strips A. After the strips A and B have been thus slotted they are put together as follows: A number of strips A corresponding to the number of slots $b$ in the strips B is selected, and one of the strips B is placed in each of the slots $a$ in the strips A, (see Fig. 6,) said strips entering the notches $b$ in the strips B. After the slots $a$ have all been thus filled other strips B are placed in the slots $a'$ in the opposite edges of the strips A, (see Fig. 6,) the slots $b$ of the last-named strips B being in the reverse position to the slot $b$ in the first-named strips B. Thus the strip B in the slots $a$ and the strip B in the slots $a'$ will lie face to face and in contact with each other for all or a portion of their opposing faces. When desired a paste, glue, or other suitable adhesive substance is placed between adjacent strips B, at one or more points, to hold the said strips more perfectly together. The various strips are now held in position, and the cells C are thus formed, the opposite sides of which are parallel to each other, two of such sides or walls, formed by the strips A, being vertical, and the other two sides or walls of the cells, formed by the strips B, being inclined, said cells being open at the bottom and top.

At one end of the strips A one of the strips B is replaced by a wider strip, B', extending in the form of a flap above the top of the tray, which flap, when the tray is in position in the case, extends upward on the inside of the case and forms a protection to prevent the eggs in the end row of cells of the tray above from coming in contact with the wall of the case, as shown in Fig. 2. If desired, however, this flap B' may be omitted, and a plain or corrugated sheet of straw-board or soft or resilient material be placed against the vertical inner faces of the case at the ends of the trays; but I prefer to employ the flaps as described, for the reason that then there are no pieces separate from the trays requiring to be separately handled and liable to be lost or misplaced.

The strips B which are in contact with each other, being secured together, as described, are firmly locked in position, and the various pieces of which the tray is composed are thus firmly secured together. Instead, however, of using two of the pieces B in the manner described, but one piece need be employed, which single piece may be suitably locked in position by any suitable means other than that described.

As above described, the cells C are inclined in one direction only, the sides of said cells which are formed by the pieces A being vertical; but it will be obvious that these pieces A may be inclined, as well as the pieces B, by simply forming the notches b in the pieces B at an angle with the edge of the strip other than a right angle, and the cells will thus be inclined in both directions. The angle of inclination of these cells may be varied to suit the manufacturer or shipper by simply varying the angularity of the notches in the strips A and B.

When these trays are to be shipped empty from place to place they are folded, (see Fig. 7, which shows a tray partly folded down,) and a large number can be made to occupy but a small space.

When eggs or fruit are to be packed in the trays a small quantity of straw, chaff, or other soft substance is placed in the bottom of the case, and one of the trays then opened out and placed in the case and the cells filled. A second tray is then placed on top of the first, this second tray being turned so that its cells will be inclined in an opposite direction to that of the cells of the tray below it. The eggs are now placed in this second tray, and will rest upon the upper portion of the inclined side of the strip B forming the inclined sides of the cells of the tray below, as shown in Fig. 2, thus dispensing with all diaphragms or horizontal partitions between the trays; and with all need of any special bottom for a tray which rests upon another tray below, other than the bottom which said tray below affords, in the novel manner already described. One tray is placed above another and filled in this manner until the case is full.

What I claim as new and of my invention, and desire to secure by Letters Patent, is—

1. A tray divided into cells, two walls of each cell being inclined and parallel to each other, substantially as and for the purposes specified.

2. A tray divided into cells open at top and bottom and inclined at an angle to the plane of the tray, substantially as and for the purposes specified.

3. Two or more trays placed one above another, and divided into cells open at top and bottom and inclined at an angle to the plane of the tray, substantially as and for the purposes specified.

4. Two or more trays placed one above another, and divided into cells open at top and bottom and inclined at an angle to the plane of the tray, the cells of one tray being inclined in an opposite direction from that in which the cells of the tray next below are inclined, substantially as and for the purposes specified.

5. In a tray, the combination of the strips A, provided with inclined slots a, and cross-strips B, having slots b, substantially as and for the purposes specified.

6. In a tray, the combination of the strips A, provided with inclined slots a a', and cross-strips B, having slots b, two of said cross-strips lying together and forming a compound strip or partition, substantially as and for the purposes specified.

7. A tray divided into inclined cells, and provided at or near one edge with the flap or strip B', substantially as and for the purposes specified.

8. Two or more trays placed one above another, and divided into cells open at top and bottom and inclined at an angle to the plane of the tray, each tray provided with the flap or strip B', substantially as and for the purposes specified.

9. In a tray, the combination of the strips A, provided with inclined slots a and cross-strips B, and strip B', substantially as and for the purposes specified.

10. In a tray, the combination of the strips A, provided with inclined slots a, and strips B, provided with slots b, and strip B', provided with slots, substantially as and for the purposes specified.

ORVILLE L. PARMENTER.

Witnesses:
J. WM. STREHLI,
W. W. CHAMBERLIN.